United States Patent
Rehberg et al.

(10) Patent No.: US 12,552,944 B2
(45) Date of Patent: Feb. 17, 2026

(54) COMPOSITE MATERIAL WITH COATING LAYER

(71) Applicant: ACS International Products LP, Tucson, AZ (US)

(72) Inventors: Kay Uwe Rehberg, Tucson, AZ (US); Mathias Frank Kuhnt, Schnaittenbach (DE); Marco Süß, Neunburg vorm Wald (DE); Reinhard Kräuter, Sulzbach-Rosenberg (DE)

(73) Assignee: ACS International Products LP, Tucson, AZ (US)

( * ) Notice: Subject to any disclaimer, the term of this patent is extended or adjusted under 35 U.S.C. 154(b) by 246 days.

(21) Appl. No.: 18/219,596

(22) Filed: Jul. 7, 2023

(65) Prior Publication Data
US 2024/0010852 A1 Jan. 11, 2024

(30) Foreign Application Priority Data

Jul. 7, 2022 (EP) .................................... 22183536
Jul. 4, 2023 (EP) .................................... 23183325

(51) Int. Cl.
*C09D 7/61* (2018.01)
*B29C 41/08* (2006.01)
(Continued)

(52) U.S. Cl.
CPC ............... *C09D 7/61* (2018.01); *B29C 41/08* (2013.01); *B29C 41/22* (2013.01); *C09D 5/02* (2013.01);
(Continued)

(58) Field of Classification Search
CPC ... C09D 5/02; C09D 7/68; C09D 7/69; C09D 7/61; C04B 26/06; C04B 26/18;
(Continued)

(56) References Cited

U.S. PATENT DOCUMENTS

| | | | |
|---|---|---|---|
| 5,266,253 A * | 11/1993 | Dijkhuizen | B29C 37/0032 264/255 |
| 5,820,799 A | 10/1998 | Barnett | |
| 6,177,179 B1 * | 1/2001 | Schock | B32B 27/20 428/323 |
| 11,260,562 B2 * | 3/2022 | Schoneveld | B28B 1/005 |

(Continued)

FOREIGN PATENT DOCUMENTS

| | | |
|---|---|---|
| DE | 19949461 | 4/2001 |
| KR | 10-2016-0050782 | 5/2016 |
| KR | 10-1657453 | 9/2016 |

OTHER PUBLICATIONS

Sobolev, et al., "Alumina Trihydrate," Chapter 16, Handbook of Fillers for Plastics, Springer, USA, Jan. 1, 1987, pp. 292-312, XP008174410, ISBN: 978-0-442-26024-8.

(Continued)

*Primary Examiner* — Thomas M Wittenschlaeger
(74) *Attorney, Agent, or Firm* — Lowe Graham Jones PLLC (57) ABSTRACT

The invention is directed to composite material comprising a base material comprising at least one first binder and at least one particulate first filler fraction based on inorganic or organic, natural or synthetic material, and a coating layer which at least partially covers the base material, wherein the coating layer comprises at least one second binder and at least one particulate second filler fraction of a particularized mean size, wherein the second filler fraction comprises particles having a particularized mineral hardness, wherein the second filler fraction comprises particles selected from a group comprising a wide variety of materials and/or mixtures thereof. The invention further relates to a method for producing a composite material and a construction element comprising such a composite material.

18 Claims, 1 Drawing Sheet

(51) Int. Cl.
  *B29C 41/22*  (2006.01)
  *C09D 5/02*  (2006.01)
  *C09D 7/40*  (2018.01)
  *B29K 509/08*  (2006.01)
  *C08K 3/36*  (2006.01)

(52) U.S. Cl.
  CPC ................ *C09D 7/68* (2018.01); *C09D 7/69*
    (2018.01); *B29K 2509/08* (2013.01); *C08K*
    *3/36* (2013.01); *C08K 2201/005* (2013.01)

(58) Field of Classification Search
  CPC ......... C04B 14/06; C04B 14/22; C04B 14/26;
    C04B 14/28; C04B 14/303; C04B 14/324;
    C04B 20/0036; C04B 22/06; C04B
    22/064; C04B 2103/0056; C04B 2103/67;
    C04B 2103/0062; C04B 2201/20; C04B
    2111/00482; B29C 41/22; B29C 41/08;
    B29C 39/025; B29C 39/24; B29L
    2031/10; B29K 2105/16; B29K 2509/08;
    C08K 2201/005; C08K 3/36
  See application file for complete search history.

(56) References Cited

U.S. PATENT DOCUMENTS

| | | | |
|---|---|---|---|
| 2002/0098362 A1* | 7/2002 | Mushovic | ............... C04B 41/52 |
| | | | 428/413 |
| 2011/0179746 A1 | 7/2011 | Donald | |
| 2014/0349106 A1* | 11/2014 | Chen | ....................... C04B 41/52 |
| | | | 524/556 |
| 2022/0212987 A1* | 7/2022 | Holtmann | ............... C04B 14/06 |
| 2024/0001690 A1* | 1/2024 | Patki | .................. B41J 11/00214 |
| 2024/0002304 A1* | 1/2024 | Patki | ................... C04B 41/4922 |
| 2024/0010852 A1* | 1/2024 | Rehberg | .................. C09D 5/02 |

OTHER PUBLICATIONS

Extended European Search Report dated Jan. 3, 2023, in EP Patent Application No. 22183536.6, 10 pages.
Examiner's Requisition dated Sep. 20, 2024, in Canadian Patent Application No. 3205505, 6 pages.
Extended European Search Report mailed Nov. 6, 2023, in European Patent Application No. 23183325.2, 9 pages.
Office Action dated Sep. 24, 2025, in Canada Patent Application No. 3205505, 4 pages.

* cited by examiner

COMPOSITE MATERIAL WITH COATING LAYER

PRIORITY CLAIM

This application claims the benefit of priority from European Patent Application No. 22 183 536.6, filed Jul. 7, 2022, the contents of which are incorporated in their entirety by reference.

FIELD OF THE INVENTION

The present invention relates to a composite material, comprising a base material and a coating layer. The invention also relates to a method for producing composite material and its application and use.

BACKGROUND OF THE INVENTION

Composite materials are known from the prior art and can be used in many fields. Important fields of application for composite materials, for example made of mineral goods, are coatings of floor or wall surfaces and sanitary products such as wash basins or shower trays. Composite materials are also increasingly being used in furniture construction. In particular when using composite materials as a work surface, for example as a countertop, high demands are placed on the composite material with regard to its load-bearing capacity, breaking strength, hardness, durability, scratch-resistance as well as cleanability. In these regions, composite materials are exposed to high mechanical and thermal loads. In addition, they are usually very noticeable, so that they should also have an attractive appearance over the long term. The visible surface should have a surface roughness that is as variable as possible, be as pore-free as possible and easy to clean. In addition, it should permanently retain this property and not be damaged during regular cleaning with suitable cleaning devices or by using it as a cutting board, for example. In particular, damage to the surface caused by cuts is supposed to be avoided.

SUMMARY OF THE INVENTION

High-strength and durable composite materials, such as so-called artificial stones, are known. Usually, these composites are made from mixtures of an acrylate resin or polyester resin and natural or colored quartz sand and optional materials, such as pigments and auxiliary materials. Desired visual surface properties of composite materials of this type could be achieved by means of partially colored fillers such as granules or mixtures of granules having effect pigments. These composite materials usually contain between 60 and 80 wt. % mineral filler of various grain sizes.

In the case of composite materials of this type, surfaces which have a granite-like or sandstone-like appearance are of particular interest. In order to be able to develop an appearance of this type, color sand mixtures of different colors are preferably used as fillers or pigments are added to the binder. The so-called "solid surface" method has been established as a method that is particularly well suited for the production of composite materials of this type. In this one-step method, a mixture of inorganic fillers is mixed with an organic binder and filled directly into a casting mold in which the compound hardens. The composite materials produced in this way are colored in their entirety, so that they offer the advantage that there are no clearly discernible color differences even if the surface flakes off or has cracks. Aluminium trihydroxide (ATH) and acrylic resin or polyester resin have been established as common materials that can be used in this method. Mixtures of cristobalite and acrylic resin among others, also referred to as Quaryl® from Villeroy & Boch as one brand name, have also been established. Composite materials of this type are usually homogeneous in color.

Important drawbacks of these composite materials are their high prize and their high (volumetric mass) density. Due to the high density and the high weight of the resulting products, these materials are not suitable to be used for products of larger dimensions, such as (outdoor) pools and other large building components.

Moreover, components of this type can no longer be subjected to post-processing on site using conventional tools. As a result, the components must already be cut to the final dimensions using stone processing tools, through holes must be drilled (for example as cable duct or pipe fairlead) and recesses (for example to insert a stove) must be introduced prior to the transport to the job site. This makes assembly much more difficult and is associated with long lead times and complex logistics.

Furthermore, different composite materials are known, which could be produced based on the so-called gelcoat technology. These composite materials usually consist of unsaturated polyester resin. A key-feature of this technology is, that in a first step, the later visible side is presented in the mold, usually sprayed into the mold in liquid or paste consistency. Various materials, such as polyester granules, color chips, pigment, aluminum hydroxide (ATH), etc., are introduced into the surface layer, the so-called gelcoat layer. This surface layer is backfilled with a predominantly inexpensive in a mixture with unsaturated polyester resin.

Composite materials of this kind could have a high quality appearing surface. By using granules of selected colors, surfaces which simulate polished stone, such as granite, could be achieved. A drawback of this process is that the matrix resin and the granules have to have substantially the same density to avoid that the granules settle during the spraying or curing step as a result of gravity. An advantage of these composite materials is that they could be processed with common equipment due to their low density and hardness. However, the surface of these composite materials is susceptible to damage such as scratches and cracks because the external layer consists mostly of pure resin.

Accordingly, it is an object of the invention to provide a composite material and a method for the production thereof which does not have the disadvantages described above. Such a composite material should be produced in a simple, inexpensive process, if possible in open molds which are also inexpensive or on or between glass panels. Such a composite material should be able to be post-processed well and, if possible, using conventional tools, and at the same time be scratch and abrasion resistant.

It has surprisingly been found that these objects can be achieved by a composite material according to claim 1, by a method for producing a composite material according to claim 10 and by a construction element according to claim 15.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

A composite material according to the invention comprises a base material. This base material comprises at least one first binder and at least one particulate first filler fraction. The composite material further comprises a coating layer which at least partially covers the base material. The coating layer comprises at least one second binder and at least one particulate second filler fraction, wherein the mean size (laser diffraction (Malvern) and/or SediGraph) of the particles of the second filler fraction is ≤0.5 mm. The second filler fraction comprises particles having a mineral hardness (Mohs scale of mineral hardness)≥6, wherein the second filler fraction comprises particles selected from a group comprising quartz sand, quartz flour, cristobalite sand and flour, dolomite flour, calcium carbonate, lime and other carbonates, aluminum oxide, corundum, quartz glass, borosilicate glass, silicon carbide, Aluminiumtrihydrat (ATH, Al(OH)3) and surface modified ATH, magnetic material, electric conductive material, antibacterial material and/or mixtures thereof. The particles of the above-mentioned group could be present in addition to the particles having a Mohs hardness≥6 and/or they could represent the particles having a Mohs hardness≥6. It has been shown that such a composite material has a very durable surface. The particles having a mineral hardness≥6 contribute to this durability by increasing the resistance against cuts and scratches. The term "particle" is intended to characterize the respective material to be solid and substantially insoluble in the second binder. Preferably, the particles are substantially immiscible in the second binder. As long as the second binder is liquid, it preferably forms a suspension with the particles of the second filler fraction.

In a preferred embodiment, the coating layer has a proportion by weight of the particulate second filler fraction of ≥40 wt-%, preferably ≥45 wt-%, particularly preferably ≥50 wt-%, preferably ≥60 wt-%, preferably ≥70 wt-% and additionally or alternatively ≤80%, preferably ≤70 wt-%, preferably ≤60 wt-%, preferably ≤55 wt-%, preferably ≤50 wt-%. A proportion by weight of the particulate second filler fraction in this range has proven to be advantageous, since it increases the hardness and/or the durability of the surface. Even if not all the particles have a mineral hardness≥6 the durability of the surface could be increased. It is assumed that the additional particles are located in free positions between the particles have a mineral hardness≥6 and increase the bonding between them via the binder.

Unless explicitly specified otherwise, all percentages specified herein shall be understood as percentages by weight (wt-%).

Preferably the second binder is a gelcoat. In the following, the terms "second binder" and "gelcoat" are used synonymously and/or interchangeable if not specified otherwise. A gelcoat is usually applied in a mold to provide a high-quality finish on the visible surface of a composite element produced in this mold. Preferably, the gelcoat is a thermosetting polymer comprising an epoxy resin and/or a (preferably unsaturated) polyester resin. Preferably the gelcoats is applied to the mold in liquid form and subsequently cured to form crosslinked polymers.

The second filler fraction can be applied together with the second binder (the gelcoat) or separately. In a first preferred embodiment, the second filler is applied separate with respect to the gelcoat. Most preferably a layer comprising the second filler is enclosed between two gelcoat layers. This could be achieved by applying a gelcoat layer in the mold followed by application of the second filler onto the gelcoat layer. Depending on the curing state of the gelcoat, the particles of the second filler can partly enter the gelcoat layer and are fixed by the gelcoat (e.g., when cured). Subsequently a further gelcoat layer is applied to form a sandwich structure as described above. Such a sandwich structure can then be backfilled by the base material.

In a preferred second embodiment, the second filler is applied together with the gelcoat. Preferably, also in this embodiment, a gelcoat layer is first applied in the mold followed by application of the mixture of second filler and the gelcoat composition. By this procedure, dust can be reduced, and binding of the particulate second filler can be improved. Application of a subsequent further gelcoat layer is also possible.

Also combinations of these two preferred embodiments are possible, especially combinations of the two kinds of application of the second filler.

Independent from the proportion by weight of the particulate second filler fraction as defined above, it is preferred that the weight proportion of the first filler fraction in the base material and/or the weight proportion of the second filler fraction in the coating layer is, preferably independent from each other, at least 30 wt-%, preferably at least 40 wt-%, more preferably at least wt-50%, most preferably at least 60 wt-%. In this way the proportion of the cost-intensive binder can be minimized, but at the same time sufficient strength and crosslinking can be ensured by the binder. In this proportion, the filler particles in the polymer (binder) matrix can still move past one another without high friction.

Preferably, the second filler has a particle size ($d_{50}$ laser diffraction (Malvern) and/or SediGraph) of ≥0.5 µm, preferably ≥1 µm, preferably ≥2 µm, preferably ≥3 µm, particularly preferably ≥5 µm, preferably ≥10 µm, preferably ≥20 µm and/or a particle size ($d_{50}$ laser diffraction (Malvern) and/or SediGraph) of ≤5000 µm, preferably ≤3000 µm, preferably ≤2000 µm, preferably ≤1000 µm, preferably ≤500 µm, preferably ≤200 µm, preferably ≤100 µm. It has been found that a particle size in this rage provides a very even distribution of the particles in the coating layer. This results in a very good binding of these particles by the binder and reduces the risks of scratches and/or chipping in the spacings between larger particles. Unless not specified differently, the particle size should be understood to be measured by SediGraph for particles having a mean particle size ($d_{50}$) up to 40 µm. Particles having a mean particle size ($d_{50}$) of more than 40 µm are measured via laser diffraction (preferably using a Malvern device).

In a preferred embodiment, the particles have a mineral hardness≥6 and the additional particles have a different average particle size ($d_{50}$ laser diffraction (Malvern) and/or SediGraph). It is particularly preferred that the average particle size ($d_{50}$ laser diffraction (Malvern) and/or SediGraph) of the particles have a mineral hardness≥6 is greater than the average particle size ($d_{50}$ laser diffraction (Malvern) and/or SediGraph) of the additional particles. In particular, it is preferred that the average particle size ($d_{50}$ laser diffraction (Malvern) and/or SediGraph) of the particles have a mineral hardness≥6 is larger by a factor of ≥1.5, preferably ≥2, particularly preferably ≥5, more preferably ≥10 and/or is larger by ≥1 μm, preferably ≥2 μm, particularly preferably ≥5 μm, more preferably ≥10 μm, preferably ≥20 μm, preferably ≥50 μm than the average particle size ($d_{50}$ laser diffraction (Malvern) and/or SediGraph) of the additional particles. As a result of such a different grain size distribution of the particles have a mineral hardness≥6 and the additional particles, the particles having a mineral hardness≥6 form cavities in the coating layer that can be occupied by the smaller additional particles. Thus, the total hardness of the surface could be increased, even if the hardness of some particles is lower. Unless not specified differently, the particle size should be understood to be measured by SediGraph for particles having a mean particle size ($d_{50}$) up to 40 μm. Particles having a mean particle size ($d_{50}$) of more than 40 μm are measured via laser diffraction (preferably using a Malvern device).

Preferably, the coating layer has a thickness of 0.02 mm-10 mm, preferably 0.05 mm-5 mm and more preferably of 0.1 mm-2 mm. It has been found that such a thickness is enough to make the surface scratch resistant and durable. However, a thickness in this range allows the composite material to be tooled and/or treated with usual (portable) machines suitable for wood or stone treatment. Especially in combination with a base material having a low density, the entire composite material could be of low density but provides a durable surface like known high-density materials.

The viscosity of the second composition is preferably ≥25 mPa·s, preferably ≥50 mPa·s, preferably ≥100 mPa·s, particularly preferably ≥250 mPa·s, particularly preferably ≥300 mPa·s, for some applications even ≥500 mPa·s or ≥750 mPa·s. Additionally or alternatively, the viscosity of the second composition is preferably ≤10,000 mPa·s, preferably ≤5,000 mPa·s, preferably ≤1,200 mPa·s, particularly preferably ≤750 mPa·s, particularly preferably ≤500 mPa·s. The viscosity of the second composition as indicated above is preferably present at least at the point in time of its filling into a casting mold. In particular when using an acrylic resin as the second binder, a viscosity of approximately 300 mPa·s (±100 mPa·s) is preferred, and when using a polyester resin as the second binder, a viscosity of ≥300 to ≤1200 mPa·s (each ±100 mPa·s) is preferred, the low viscosities of the respective ranges in particular being preferred. When using a PU resin, a viscosity of ≥300 to ≤1200 mPa·s (in each case ±100 mPa·s) is also preferred, in this case too, in particular, the selection of a viscosity from the lower sub-range, i.e., between approximately 300 and 800 mPa·s, particularly preferably between 300 and 500 mPa·s, being preferred. It has been found that a second composition having a viscosity as described above could easily be applied into a mold, e.g., by spraying and allows homogeneous covering of the mold and providing only a desired precipitation of the filler particles within the second composition.

Preferably, the coating layer comprises a crosslinking reagent and/or is crosslinked by a crosslinking reagent. Thus, the durability and hardness of the coating layer could be increased. Preferably, the crosslinking reagent could be activated by a crosslinking initiator, which is preferably also part of the coating layer. The crosslinking reagent crosslinks the second binder and/or the coating layer and/or increases its viscosity. Preferably, the crosslinking initiator and/or the crosslinking reagent could be activated thermally and/or by irradiation. Thus, or by accelerator (for example Cobalt-based material) the time for hardening the coating layer and/or the degree of crosslinking could be adjusted to specific needs.

In a preferred embodiment, the weight proportion of the first filler fraction in the base material and/or the weight proportion of the second filler fraction in the coating layer is, preferably independent from each other, at least 30 wt-%, preferably at least 40 wt-%, more preferably at least 50 wt-%, most preferably at least 60 wt-%. A high weight proportion of the filler fraction is advantageous since the filler is often less expensive than other components like a binder. Thus, by high weight proportion of the filler fraction the amount of binder and the costs of the entire composite material could be reduced. Furthermore, a high weight proportion of the second filler fraction in the coating layer has been found to be advantageous for increasing the hardness and durability of the coating layer, as described above.

Since a low-weight first filler is especially preferred, in a preferred embodiment, the base material has a proportion of the first filler of ≥40 wt-%, preferably ≥45 wt-%, particularly preferably ≥50 wt-%, preferably ≥60 wt-%, preferably ≥70 wt-% and additionally or alternatively ≤80 wt-%, preferably ≤70 wt-%, preferably ≤60 wt-%, preferably ≤55 wt-%, preferably ≤50 wt-%. A proportion by volume of the first filler in this range has proven to be advantageous, since in this way the proportion of the cost-intensive binder can be minimized, but at the same time sufficient strength and crosslinking can be ensured by the binder. In this proportion, the filler particles in the polymer matrix can still move past one another without high friction.

The particulate first filler fraction can be selected from a plurality of particles. It can be inorganic or organic. Additionally or alternatively, the particulate first filler fraction can be a natural or a synthetic material. Thus, the particulate first filler fraction can be selected to adapt the properties of the base material to specific needs/requirements. Since the base material (and thus the particulate first filler fraction) is covered in the composite material by the coating layer, it is also possible to use a material as particulate first filler fraction, whose composition is not clearly known (e.g., waste or recycled material).

Preferably, the density of the base material is lower than that of the coating layer. More preferably, a value of a density of the base material is preferably at least 5%, more preferably at least 10%, most preferably at least 20% lower that a respective value of a density of the coating layer. Due to the lower density the composite material could be light-weight, even if the coating layer has a high density.

Preferably, the hardness of the base material is lower than that of the coating layer. More preferably, a value of a Shore hardness of the base material is preferably at least 5%, more preferably at least 10%, most preferably at least 20% lower that a respective value of a Shore hardness and/or a density of the coating layer. The lower hardness of the base material could provide the possibility that the composite material could be treated with usual tools, e.g., for reworking at the installation site, even if the coating layer is very hard.

Preferably, a surface of the composite material comprising the coating layer has a high mechanical resistance. The high mechanical resistance is preferably determined by a material loss in the Taber Abrasion Test and or as a scratch hardness according to DIN EN 13310. In a preferred embodiment, the coating layer provides a high mechanical resistance characterized by a material loss in the Taber Abrasion Test of ≤40 mg per 100 cycles. More preferably the material loss in the Taber Abrasion Test is ≤30 mg per 100 cycles or even more preferably ≤20 mg per 100 cycles.

Additionally, or alternatively the coating layer provides a high mechanical resistance characterized by a scratch hardness according to DIN 68861-4 in the range of ≥1.2 to ≤2.5 N. More preferably the scratch hardness according to DIN 68861-4 is in the range of ≥1.4 to ≤2.2 N or even more preferably in the range of ≥1.5 to ≤2 N. these values have been found to provide a very durable surface of the composite material, which can still be treated with usual tools, e.g., for reworking at the installation site.

Preferably the composite material complies the demands specified by DIN EN ISO 19712 for worktops.

Preferably, the density of the composite material is less than 2.5 kg/l, preferably in the range of between 1.5 and 2.3 kg/l. Thus, handling and transport of large elements made from the composite material is still possible.

Preferably, the density of the second filler fraction is higher than that of the second binder. In a preferred embodiment, the density of the second filler fraction is ≥50%, more preferably ≥75%, most preferably ≥100% higher than that of the second binder. Additionally or alternatively, the density of the second filler fraction is in the range of ≥1.0 and ≤5.5 kg/l, more preferably in the rage of ≥1.5 and ≤4.7 kg/l, most preferably in the rage of ≥1.8 and ≤4.1 kg/l.

Additionally or alternatively, the second binder preferably has a density which is between the density of ≥0.8 kg/l, preferably ≥0.9 kg/l, preferably ≥1 kg/l, preferably ≥1.1 kg/l, preferably ≥1.2 kg/l, and additionally or alternatively ≤1.7 kg/l, preferably ≤1.6 kg/l, preferably ≤1.5 kg/l, preferably ≤1.4 kg/l, preferably ≤1.3 kg/l, preferably ≤1.2 kg/l, preferably ≤1.1 kg/l.

In contrast to other materials featuring a stone-like appearance, the different density of the second filler fraction and the second binder results in and enrichment of the second filler fraction comprising the particles having a mineral hardness≥6 in the lower volume due to gravity. Thus, the hard particles are enriched at the outer surface of the coating layer, making this surface even harder.

Preferably, reworking of the composite material at the installation site is possible using common transportable tools such as those commonly used for example by carpenters, tilers or plumbers. Preferably processing of the composite material is possible in a dry state, i.e., preferably without water cooling. Preferably, the composite material can be mechanically processed without generating (flying) sparks (e.g., during sawing).

In a preferred embodiment, the coating layer comprises a plurality of layers, wherein two adjacent layers comprise different filler particles and/or have a different weight proportion of a particulate filler and/or comprise filler particles having a different size distribution.

Preferably, the coating layer is clearly delineated from the base material. More preferably there is no smooth transition between the coating layer and the base material. It is possible, that an intermediate layer is located between the coating layer and the base material. Preferably, this intermediate layer is a binding layer and/or a glue.

In a preferred embodiment, the coating layer contains a pigment. This allows the composite material to be given desired visual effects. The at least one pigment can be introduced in different ways, although these are not mutually exclusive, but can optionally also be used jointly.

One way of adding a pigment is to color the entire second composition with pigment. This is particularly preferred when a homogeneous color of the outer surface of the composite material and/or the coating layer is desired. Since the binder is also colored in this method, a particularly homogeneous color impression is created.

Preferably, particles of the second filler have different colors. Preferably a mixture of a plurality of differently colored fillers is used to form the second filler. It would be conceivable, for example, that some particles of the second filler have a first color, other particles of the second filler have a second color, and yet other particles of the second filler have a third color or an effect pigment that gives these particles, for example, a particular light refraction or a particular reflectivity.

In a preferred embodiment, particles of the second filler have a desired color. The color of these particles could be achieved by a surface coating which changes the visual appearance of the particles. Preferably, different particle fractions of the second filler have a surface coating of the same color or preferably of different colors and/or a surface coating which changes the light refraction and/or reflection. There is thus the possibility of coloring particles of the filler preferably before producing the (sprayable) second composition. This procedure allows particular visual effects which can result in a desired optical appearance of the composite material, e.g., a granite-like or sandstone-like appearance. In this case, the color impression of the composite material is not homogeneous, but individual colored filler particles can be recognized. However, also a homogeneous appearance could be achieved by using only filler particles having the same color or the same surface coating.

The base layer preferably comprises ≤10% quartz, preferably ≤5% quartz, more preferably ≤2% quartz and is most preferably free from quartz. Thus, the base material can have a very low density, which facilitates handling of the composite material.

The surfaces of the composite material, in particular a surface of the coating layer, can be smooth or structured (for example similar to slate) independently of one another.

A composite material preferably has a at least in large parts substantially cuboid geometry. Since the use of such a composite material as a worktop is particularly preferred, such a cuboid has a significantly smaller extension in one direction, preferably in the height direction (or thickness), than in the other two directions, namely the length direction and the width direction. In particular, it is preferred that the extension in the height direction is less than 20% of each of the two other directions. In particular, an extension of the composite material in the height direction of ≤10 cm, preferably ≤7 cm, preferably ≤6 cm, particularly preferably ≤5 cm, preferably ≤4 cm, particularly preferably ≤3 cm is provided. It is preferred that the composite material is designed as a panel and particularly preferably has a thickness (height) of from 1 to 5 cm.

A further aspect of the invention is a method for producing a composite material. Preferably the composite material produced by this method is a composite material as described above. The method for producing a composite material comprises the steps of.

a) providing a first composition comprising at least one first binder and at least one particulate first filler fraction, b) providing at least one second binder and at least one particulate second filler fraction, wherein the mean size ($d_{50}$ laser diffraction (Malvern) and/or SediGraph) of the particles of the second filler fraction is ≤0.5 mm and the second filler fraction comprises particles having a mineral hardness (Mohs scale of mineral hardness)≥6, wherein the second filler fraction comprises particles selected from a group comprising quartz sand, quartz flour, cristobalite sand and flour, dolomite flour, calcium carbonate, lime and other carbonates, aluminum oxide, corundum, quartz glass, borosilicate glass, silicon carbide, ATH, and surface modified ATH, magnetic material, electric conductive material, antibacterial material and/or mixtures thereof,
c) providing a mold,
d) coating an inner surface of the mold with
   a layer of a second composition comprising the second binder and the particulate second filler fraction, or
   a layer of the second binder and a subsequent layer comprising the particulate second filler fraction,
e) allowing the second binder and/or the second composition to increase its viscosity,
f) filling the first composition into the mold, and
g) allowing the first composition to harden.

This method has been found to provide a fast possibility for producing a composite material (e.g., such as described above).

Preferably the steps a)-d) are performed in this sequence. However, also variations of the sequence are possible. Further (not-mentioned) steps could be performed between two steps mentioned above. These further steps could for example include a transport of a pre-product, a change of temperature, a change of the composition of the first and/or second composition and others.

Preferably, the inner surface of the mold is coated with the second composition by spraying the second composition or the binder into the mold. Spraying has been found especially suitably since this method provides a fast possibility for evenly applying a layer of the second composition in the mold.

Preferably a plurality of layers of the second composition, the second binder and/or the particulate second filler fraction are applied into the mold. Thus, the thickness of the coating layer could be adjusted to specific needs. The composition of the second composition, the second binder and/or the particulate second filler fraction could differ between all or some of the applied layers.

In a preferred embodiment, the second binder comprises a polymerization initiator and/or crosslinking initiator. This allows for activating the polymerization initiator and/or crosslinking initiator at a pregerminated time. Accordingly, the polymerization and/or crosslinking could take place after binder and filler have been mixed to form a desired composition and/or the filler has sedimented and forms a surface which is enriched with particles of the filler. By activating the polymerization initiator and/or crosslinking initiator preferably increasing of the viscosity of the second binder and/or the second composition is initiated. The initiator is preferably activated thermally and/or by irradiation. It has been found that such an activation could easily be initiated and is especially suitable for thin layers like the coating layer.

Preferably, the second composition and/or the second binder and/or the particulate second filler fraction is applied into the mold until the layer or a stack of these layers has a thickness of 0.02 mm-10 mm, preferably 0.05 mm-5 mm and more preferably of 0.1 mm-2 mm. These thicknesses is advantageous since it provides a desired hardness but allows for lightweight and post-processable composite materials, in combination with a respective base material.

A further aspect of the invention is a further method for producing a composite material. Preferably the composite material produced by this method is a composite material as described above. The method for producing a composite material comprises the steps of:
x) providing a base material comprising a first composition comprising at least one first binder and at least one particulate first filler fraction, wherein an outer surface of the base material is formed at least in sections by the first composition,
y) providing a second composition comprising at least one second binder and at least one particulate second filler fraction, wherein the mean size ($d_{50}$ laser diffraction (Malvern) and/or SediGraph) of the particles of the second filler fraction is ≤0.5 mm, preferably <3.0 mm, more preferably ≤1.0 mm and the second filler fraction comprises particles having a mineral hardness (Mohs scale of mineral hardness)≥6, wherein the second filler fraction comprises particles selected from a group comprising quartz sand, quartz flour, cristobalite sand and flour, dolomite flour, calcium carbonate, lime and other carbonates, aluminum oxide, corundum, quartz glass, borosilicate glass, silicon carbide, magnetic material, ATH, and surface modified ATH, electric conductive material, antibacterial material and/or mixtures thereof,
z) applying the second composition onto an outer surface of the base material formed by the first composition and allowing the second composition to harden. This method has been found suitable to protect a surface of the base material with a coating layer.

Preferably the surface of the base is a surface of a composite material as described above, which has been reworked, e.g., sewed. When a composite material as described above is reworked, the coating layer is often damaged or broken. Thus, in these areas the base material is not protected by the hard coating layer anymore. Furthermore, the optical properties of the composite material changes between surfaces covered by the coating layer and surfaces at which the base material is visible. After application and hardening of the second composition (step z)), the visible surface of the composite material is preferably homogeneously covered by the cover layer and a homogeneous optical appearance could be achieved. Furthermore, the entire surface covered by the coating layer preferably provides at least some of the advantageous properties described above. Thus, the coating layer is very hard and can protect the base material from damages.

Step z) is preferably performed by spraying, since a very homogeneous layer of the second composition could be applied. However, also application of a suspension of the second composition could be advantageous in some embodiments.

Preferably the second composition and/or the coating layer is reworked after hardening of the second composition, e.g., by abrasive techniques like sanding. Thus, a continuous and very homogenous coating layer could be achieved. This is especially desired for visible surfaces of reworked furniture like a worktop, a work surface, a countertop and any a sanitary product.

A further aspect of the invention is a construction element comprising a composite material as described above. Such a construction element is part of a building component selected from a group comprising a flooring, a wall covering, a worktop, a work surface, a tile, a countertop, a sanitary product, a lavatory, a washbasin a shower tray, a bathtub, a pool, a whirlpool basin, a patio decking, a furniture construction and a piece of furniture. The respective building component comprising the above-mentioned composite material are very durable due to the coating layer. Preferably these building components and could be post-processing on site using conventional tools. Preferably these building components are lighter than other known building components providing a similar hardness and/or durability. Thus, transport is easier and less cost intensive.

Example 1: Negative Example with Glass Filler, Procedure 1

A binder is applied in the mold. The binder preferably covers the entire inner surface of the mold or at least those parts to which the coating layer should be provided. Then a layer of a filler material (glass particles having a Mohs hardness<6) is attached to the binder layer. The particles of the filler are then covered with a gelcoat. The gelcoat is allowed to enter at least in parts in the spacings between the particles of the second filler to form a cover layer comprising the filler and the gelcoat as a binder. Then, a further layer of the second filler material is applied onto the gelcoat layer and the filler particles are subsequently bound by a further gelcoat layer.

The innermost gelcoat layer is then backfilled with the first composition, which is allowed to increase its viscosity or to harden. After hardening the resulting composite material could be taken out of the mold.

The resulting composite material provides an abrasion (Taber abrasion test) of 20-30 mg per 100 cycles. The composite material can be cut dry using usual tools. See Table 1-1 and 1-3 below.

Example 2: Positive Example with Fine Quartz Filler, Procedure 1

A second binder (also referred to as gelcoat) is applied on the inner surfaces of the mold on which the coating layer should be build up. Onto the gelcoat a layer of the second filler (fine quartz particles having a Mohs hardness≥6) material is attached. The particles of the filler are allowed to enter into the gelcoat layer. Then the filler is covered with a further gelcoat layer. Onto the gelcoat a further layer of the second filler material is applied. Then the filler particles are covered by a further gelcoat layer.

Similar to example 1, the innermost gelcoat layer is then backfilled with the first composition, which is allowed to increase its viscosity or to harden. After hardening the resulting composite material could be taken out of the mold.

The resulting composite material provides an abrasion (Taber abrasion test) of less than 15 mg per 100 cycles. The composite material can be cut dry using usual tools. See Table 1-2 below.

Example 3: Positive Example with Fine Quartz (or Cristobalite) Filler, Procedure 2

In example 3 the first steps are performed similar to example 2. However, the gelcoat is only applied twice and the second filler (fine quartz particles) only once. Thus, only a single layer of the second composition is created.

Similar to examples 1 and 2, the innermost gelcoat layer is then backfilled with the first composition, which is allowed to increase its viscosity or to harden. After hardening the resulting composite material is taken out of the mold.

The resulting composite material provides an abrasion (Taber abrasion test) of less than 15 (16) mg per 100 cycles. The composite material can be cut dry using usual tools. See Table 1-4 below.

TABLE 1

Results Taber abrasion test:

| Composition | Abrasion [mg]/ 100 cycles |
|---|---|
| 1 Granuverre 100-200 Filler 33.33% Gelcoat 66.67% Backfill FL-50 | 25 |
| Granuverre 200-300 Filler 33.33% Gelcoat 66.67% Backfill FL-50 | 21.2 |
| Granuverre 100-200 Filler 38.46% Gelcoat 61.54% Backfill FL-50 | 25 |
| Granuverre 200-300 Filler 38.46% Gelcoat 61.54% Backfill FL-50 | 21 |
| 2 White 123/FQ 70% Polystone 20% $CaCO_3$ 10% Lightweight filler | 12.8 |
| White 123/FQ 70% Polystone 20% $CaCO_3$ 10% $K_2CO_3$ | 11.6 |
| White 123/FQ 70% Polystone 30% Leichtfullstoff | 12.8 |
| White 123/FQ 70% Polystone 30% Kaliumkarbonat | 11.8 |
| 3 White Glass 70% Polystone 20% $CaCO_3$ 10% $K_2CO_3$ | 28 |
| White Glass 70% Polystone 20% $CaCO_3$ 10% Lightweight filler | 29.6 |
| White Glass 70% Polystone 30% $K_2CO_3$ | 27.8 |
| White Glass 70% Polystone 30% Lightweight filler | 28.8 |
| 4 Cristobalite 70% Polystone 20% $CaCO_3$ 10% $K_2CO_3$ | 15.8 |
| Cristobalite 70% Polystone 30% Lightweight filler | 13.4 |
| Cristobalite 70% Polystone 20% $CaCO_3$ 10% Lightweight filler | 15.8 |
| Cristobalite 70% Polystone 30% $K_2CO_3$ | 14.2 |

Figure 1:
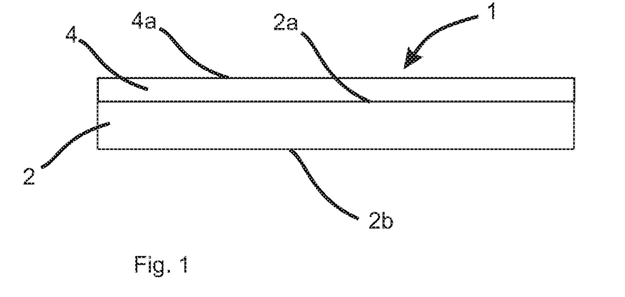
FIG. 1 is a section through a composite material according to the invention in a first embodiment.

In FIG. 1 a first embodiment of a composite material 1 according to the invention is shown schematically. The composite material 1 comprises a base material 2. A surface 2a of the base material 2 is covered with a cover layer 4. The cover layer 4 has a visible outer surface 4a.

The cover layer 4 comprise a filler material comprising particles having a hardness≥6. Thus, the base material is covered by a durable covering, which prevents damages of the core. The surface 4a of the cover layer 4 is visible and is also possibly exposed to high mechanical stress. Thus, it is very important that this surface 4a of the cover layer provides high mechanical stress resistance and is decorative.

Figure 2:
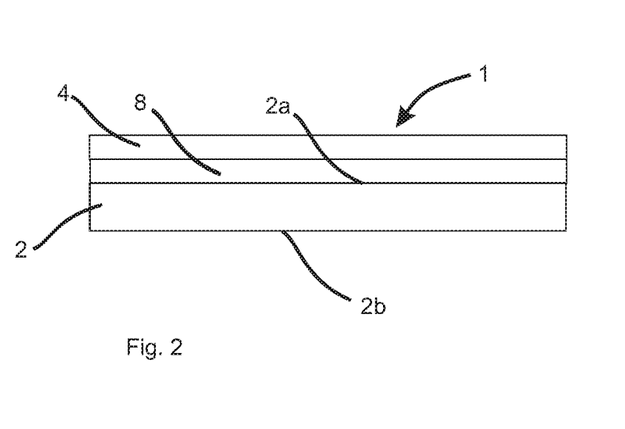
FIG. 2 is a section through a composite material according to the invention in a second embodiment.

In FIG. 2 a second embodiment of a composite material 1 according to the invention is shown schematically. In contrast to the embodiment shown in FIG. 1, one of the cover layers 4 comprise a further cover layer 8. The additional cover layer 8 is arranged on one of the surfaces 2a of the base material 2 and is arranged between the base material 2 and the outermost cover layer 4. Such an additional cover layer 8 increases the thickness and durability of the protection on this side of the base material 2. It has been found that a stack of multiple cover layers 4, 8 increases the scratch resistance to some amount but also reduces the risks of damages by chipping to a very large amount.

The layers 4 and 8 together, resulting in a cover layer protecting the base material and the entire composite material with respect to mechanical stress. By combining two or more cover layers, very good protection properties could be ensured. Furthermore, the outermost surface 4a can be selected to fulfil decorative requirements.

Independent of the number of cover layers 4, 8, on the surface 2a of the base material, one or more additional layers (not shown) could be present in the opposite surface 2b of the base material. Such an additional layer can for example be a carrier for the composite material or an adhesive, by which the composite material is attached to a carrier (e.g., a wall or other construction element). Optionally, one or more additional layer could be a cover layer similar to the cover layers 4 and/or 8.

The applicant reserves the right to claim all the features disclosed in the application documents as essential to the invention, provided that these are novel, individually or in combination, over the prior art.

LIST OF REFERENCE NUMERALS 1 composite material,
2 base material,
2a, 2b opposite surfaces of the base material,
4 cover layer,
8 additional cover layer.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. Composite material, comprising:
   a base material comprising at least one first binder and at least one particulate first filler fraction, and a coating layer which at least partially covers the base material, wherein the coating layer comprises at least one second binder and at least one particulate second filler fraction, wherein the mean size (laser diffraction (Malvern) and/or SediGraph) of the particles of the second filler fraction is <5.0 mm,
   characterized in that the second filler fraction comprises particles having a mineral hardness (Mohs scale of mineral hardness)≥6, wherein the second filler fraction comprises particles selected from a group comprising quartz sand, quartz flour, cristobalite sand and flour, dolomite flour, calcium carbonate, lime and other carbonates, aluminum oxide, corundum, quartz glass, borosilicate glass, silicon carbide, ATH, and surface modified ATH, magnetic material, electric conductive material, antibacterial material and/or mixtures thereof, wherein
      the second filler fraction further comprises additional particles having a different average particle size (d50 laser diffraction (Malvern) and/or SediGraph) than the particles having a mineral hardness≥6, wherein the average particle size (d50 laser diffraction (Malvern) and/or SediGraph) of the particles have a mineral hardness≥6 is larger by a factor of ≥1.5 than the average particle size (d50 laser diffraction (Malvern) and/or SediGraph) of the additional particles,
      wherein the additional particles occupy cavities formed by the particles having a mineral hardness≥6; and
      a surface of the composite material comprising the coating layer has a high mechanical resistance wherein a material loss in the Taber Abrasion Test is ≤50 mg per 100 cycles.

2. Composite material according to claim 1, characterized in that the coating layer has a thickness of 0.02 mm-10 mm.

3. Composite material according to claim 1, characterized in that the coating layer comprises a crosslinking reagent and/or is crosslinked.

4. Composite material according to claim 1, characterized in that the weight proportion of the first filler fraction in the base material and/or the weight proportion of the second filler fraction in the coating layer is, preferably independent from each other, at least 30 wt-%.

5. Composite material according to claim 1, characterized in that the density of the second filler fraction is in the range of ≥1.0 and ≤5.5 kg/l.

6. Composite material according to claim 1, characterized in that the density of the base material is lower than that of the coating layer, wherein a value of a density of the base material is preferably at least 5% lower that a respective value of a density of the coating layer.

7. Composite material according to claim 1, characterized in that the surface of the composite material comprising the coating layer has a high mechanical resistance wherein a material loss in the Taber Abrasion Test is ≤30 mg per 100 cycles.

8. Composite material according to claim 7, characterized in that the material loss in the Taber Abrasion Test is ≤20 mg per 100 cycles.

9. Composite material according to claim 1, characterized in that the second filler has a particle size ($d_{50}$ laser diffraction (Malvern) and/or SediGraph) of ≥0.5 μm and/or a particle size ($d_{50}$ laser diffraction (Malvern) and/or SediGraph) of ≤3,000 μm.

10. Composite material according to claim 1, characterized in that the coating layer comprises a plurality of layers, wherein two adjacent layers comprise different filler particles and/or have a different weight proportion of a particulate filler.

11. Construction element comprising a composite material according to claim 1, characterized in that the construction element is part of a building component selected from a group comprising a flooring, a wall covering, a worktop, a work surface, a tile, a countertop, a sanitary product, a lavatory, a washbasin, a shower tray, a bathtub, a pool, a whirlpool basin, a patio decking, a furniture construction and a piece of furniture.

12. Composite material according to claim 1, characterized in that the mean size (laser diffraction (Malvern) and/or SediGraph) of the particles of the second filler fraction is <3.0 mm, preferably ≤1.0 mm.

13. Method for producing a composite material having a surface which has a high mechanical resistance wherein a material loss in the Taber Abrasion Test is ≤50 mg per 100 cycles, comprising the steps:
   a) providing a first composition comprising at least one first binder and at least one particulate first filler fraction,
   b) providing at least one second binder and at least one particulate second filler fraction, wherein particles of the second filler fraction have a mean size ($d_{50}$ laser diffraction (Malvern) and/or SediGraph) of ≤0.5 mm and a mineral hardness (Mohs scale of mineral hardness)≥6, wherein the second filler fraction comprises particles selected from a group comprising quartz sand, quartz flour, cristobalite sand and flour, dolomite flour, calcium carbonate, lime and other carbonates, aluminum oxide, corundum, quartz glass, borosilicate glass, silicon carbide, ATH, and surface modified ATH, magnetic material, electric conductive material, antibacterial material and/or mixtures thereof, wherein the second filler fraction further comprises additional particles having a different average particle size (d50 laser diffraction (Malvern) and/or SediGraph) than the particles having a mineral hardness≥6, wherein the average particle size (d50 laser diffraction (Malvern) and/or SediGraph) of the particles have a mineral hardness≥6 is larger by a factor of ≥1.5 than the average particle size (d50 laser diffraction (Malvern) and/or SediGraph)

of the additional particles, wherein the additional particles occupy cavities formed by the particles having a mineral hardness≥6, c) providing a mold, d) coating an inner surface of the mold with
- a layer of a second composition comprising the second binder, the particulate second filler fraction and the additional particles, or
- a layer of the second binder and a subsequent layer comprising the particulate second filler fraction, e) allowing the second binder and/or the second composition to increase its viscosity, f) filling the first composition into the mold, and g) allowing the first composition to harden.

14. Method for producing a composite material according to claim 13, characterized in that the inner surface of the mold is coated with the second composition by spraying the second composition or the binder into the mold and/or the particulate second filler fraction onto the previously sprayed second binder by spraying.

15. Method for producing a composite material according to claim 13, characterized in that a plurality of layers of the second composition, the second binder and/or the particulate second filler fraction are applied into the mold.

16. Method for producing a composite material according to claim 13, characterized in that the second binder comprises a polymerization initiator and/or crosslinking initiator, and increasing the viscosity of the second binder and/or the second composition is initiated by activating the initiator thermally and/or by irradiation and/or by acceleration.

17. Method for producing a composite material according to claim 16, characterized in that the second composition is initiated by activating the initiator thermally and/or by irradiation and/or by acceleration.

18. Method for producing a composite material according to claim 13, characterized in that the second composition and/or the second binder and/or the particulate second filler fraction is applied into the mold until the layer or a stack of these layers has a thickness of 0.02 mm-10 mm.

* * * * *